Feb. 20, 1940. R. KNAPP Re. 21,363

SHAVING DEVICE AND MOTOR THEREFOR

Original Filed Oct. 20, 1936 2 Sheets-Sheet 1

INVENTOR
RAYMOND KNAPP
BY
H. Clay Deventer
ATTORNEY

Feb. 20, 1940. R. KNAPP Re. 21,363

SHAVING DEVICE AND MOTOR THEREFOR

Original Filed Oct. 20, 1936 2 Sheets-Sheet 2

INVENTOR
RAYMOND KNAPP
BY
H. R. Van Deventer
ATTORNEY

Reissued Feb. 20, 1940 Re. 21,363

UNITED STATES PATENT OFFICE 21,363

SHAVING DEVICE AND MOTOR THEREFOR

Raymond Knapp, Long Island City, N. Y., assignor to Knapp-Monarch Company, St. Louis, Mo., a corporation of Missouri Original No. 2,077,329, dated April 13, 1937, Serial No. 106,527, October 20, 1936. Application for reissue December 5, 1938, Serial No. 244,101

14 Claims. (Cl. 30—43)

This invention relates to shaving devices and motors therefor.

An object of the invention is to provide a device of the above character having a quick detachable shaving head.

Another object is to provide a device of the above character in which a shear plate member may be simply and cheaply manufactured.

A further object is to provide an improved unitary cutter member that can only be placed in the device in the proper position for use.

Another object is to provide a device of the above character in which the motor will be ventilated through the main casing of the device.

A further object is to provide an improved A. C.—D. C. electric motor for operating a shaving device, said motor having an improved interrupter mechanism associated with the rotor thereof.

A still further object is the provision of a new and improved shaving device in which is incorporated a shearing plate adapted to be brought into contact with the skin and which is provided with a suitable stiffening means so that there will be no depression in the cutter teeth during shaving operation.

Still another object is the provision of a shaving device adapted to be grasped in the palm of the hand, which incorporates a shearing plate disposed at such an angle that when the device is drawn over the face, the shearing plate will assume a natural angle parallel to the face and be guided into such a position by the natural position of the hand of the operator.

Other objects and advantages of the invention will become apparent during the course of the following description in connection with the accompanying drawings, in which.

Figure 1:
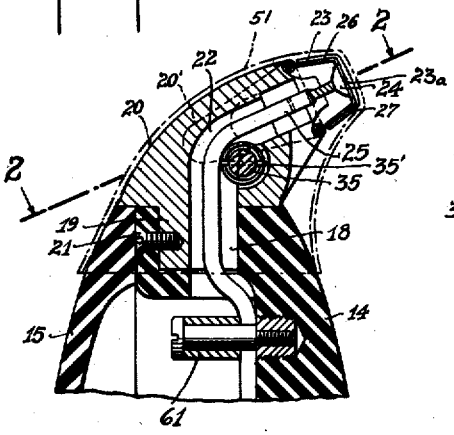
Figure 1 is a vertical sectional view through the upper portion of a preferred form of the device.

The numeral 14 denotes a main casing which may be made of Bakelite or the like and in which is mounted a motor and various other parts as hereinafter described. This casing is provided with a cover 15 and the casing may be slotted as shown at 16 and projecting through from the bottom of said slots into the interior of the casing are the vents 17 which permit the circulation of air in and around the motor for cooling the same. Obviously, the cover 15 may be provided with similar slots and vents if desired. The casing and cover are made of proper shape to be readily grasped by the hand, and the vents 17 lying below the surface in which the slots 16 are formed, air can find egress and exit from the casing through the vents and slots in an obvious manner.

The upper part of the casing is slotted as indicated at 18 to receive the downwardly projecting end 19 of a cutting head generally denoted by the numeral 20 which is held in position in the casing 14 by screws 21 or in any other suitable manner. The cutting head 20 has a channel or opening 22 therethrough, the bottom end of which communicates with the interior of the casing 14 and the upper end of which terminates below the shear plate generally denoted by the numeral 23.

A cutter bar 24 is positioned immediately below the shear plate and is adapted to be oscillated by the cutter arm 25 in a manner to be presently described.

Figure 3:
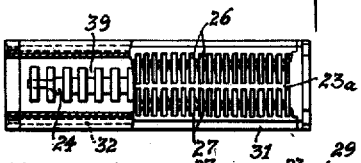
Figure 3 is a top view of the shear plate partially broken away to show the cutter which lies below the plate.
Figure 5:
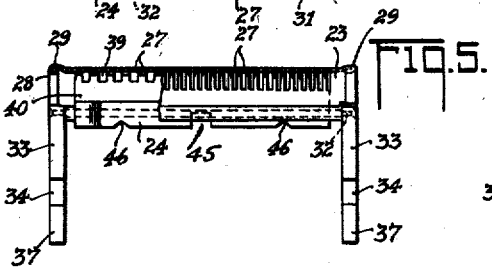
Figure 5 is a side view, partially broken away, of the shear plate assembly showing the cutter in place therein.

The shear plate 23 is preferably made from a stamping and the same is provided with two rows of perforations 26, 27 which extend from near the center of the plate outwardly and down the sides thereof, as shown in Figures 3 and 5. The upper portion of the shear plate 23 therefore forms a face-engaging member having a plurality of slots therein of sufficient width to receive at least one hair, and said member is of such thickness as to maintain the surface of the skin being shaved from entering said slots and extending above the rear surface of the member.

Figure 6:
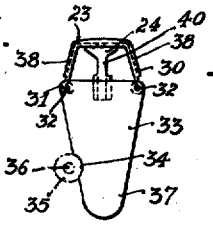
Figure 6 is an end view of the shear plate assembly showing how the same is positioned on the cutting head by means of a pin as hereinafter described.

The cutter bar 24 engages the rear surface of the shear plate and operates in a manner hereinafter described, to sever hair projecting inwardly through the slots 26 and 27. The ends of the shear plate 23 are folded over as indicated at 28 to form smooth, rounded surfaces which project slightly above the top of the plate as indicated at 29 and which extend downwardly as shown at 30 toward the lower edges of the plate and the lower edges of the plate are given a tubular shape as shown at 31 in Figures 3 and 6, being rolled up on themselves in order to form supports for pins 32 by means of which the plate 23 is riveted to a pair of end supports 33 shaped as shown in Figures 5 and 6. These end supports are adapted to slide into correspondingly shaped recesses shown in dotted lines at 20′ in the cutter head 20.

The end supports 33 have semi-circular notches 34 therein.

Figure 2:
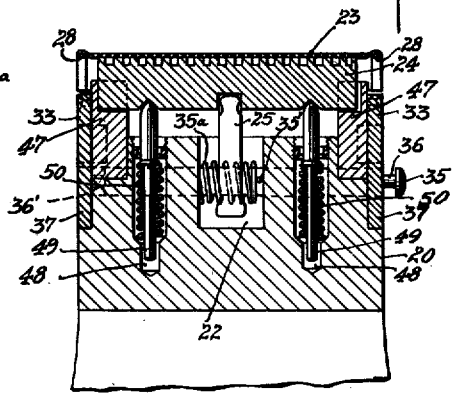
Figure 2 is a sectional view on the line 2—2 Figure 1.

A pin 35 is mounted to slide in an aperture in the head 20 as shown in Figures 1 and 2, and is provided with a cross pin 35′ which engages a spring 35a which bears against the side wall of the channel 22 thereby keeping the pin 35 pressed outwardly in the position shown in Figure 2. This pin 35 has a cutaway portion as shown at 36 on one end and a cutaway portion 36′ near the opposite end, and when pin 35 is pressed inwardly these cutaway portions permit the shanks 37 of the end supports 33 to bottom in the slots provided therefor in the cutter head. The pin 35 now being released, the full diameter of same comes up into the notches 34, thereby holding the shear plate assembly in place on the cutter head 20 and it is obvious from the foregoing that the plate assembly can be removed as a unit from the cutter head by pressing the pin 35 inwardly and pulling the shear plate assembly outwardly.

The unit shear plate assembly as shown and described is so positioned in place for use that the underside of the top of the shear plate 23 is in contact with, but not supported by the cutter bar, the top of the plate 23 being sufficiently stiff to be self-supporting so that it does not yield when brought in contact with the face when shaving.

The slots 26, 27 along each edge of the shear plate extend downwardly on the sloping sides thereof so that when the shear plate is pressed against the skin in shaving the hairs enter freely in the side portions 38 of each group of slots and are not bent downwards as is the case when the sides of the cutter plate are solid or when the cutter plate is provided with ridges or where the teeth formed by portions of the shear plate between the slots have pointed shoes at their ends, the construction being such that the cutter bar 24 can not only cooperate with the top portion of the shear plate immediately above it, but hairs entering in the side slots 38 are free to enter between the teeth in the spaces 39 of the cutter bar without being bent or smoothed downwardly against the face, which interferes with the operation of shaving.

Figure 4:
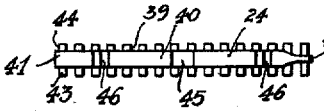
Figure 4 is a bottom view of the cutter used in the device, Figure 1.

The cutter bar 24 as shown in Figure 4 comprises a toothed face portion, the upper flat side of said teeth being adapted to engage the under side of the shear plate 23 and the bar has a downwardly extending shank 40 which is of a certain thickness on one end as indicated at 41 and which may be of a different thickness on the other end 42. This shank is not positioned in the exact center of the teeth which may project further to one side as indicated at 43 than they do on the other side as indicated at 44.

The cutter bar has a central notch 45 therein and two notches spaced on each side thereof as shown at 46 and the ends 41, 42 of the cutter bar fit into properly formed slots in supports 47 which may be formed integral with the head 20 or which are attached thereto in any suitable manner. When so supported, the central slot 45 of the cutter bar is engaged by the upwardly extending end of the cutter arm 25 so as to be oscillated thereby as the bar is free to move in the supports 47.

Located in the head 20 are recesses 48 adapted to receive pins or plungers 49 which have upper rounded ends adapted to fit into the slots 46 in the shank 40 of the cutter bar 24. These pins are provided with springs 50 which engage shoulders on said pins as shown in Figure 2 and urge the pins upward to hold the cutter bar against the under side of the shear plate 23. It will be noted that the cutter bar is substantially T-shaped and that the shear plate is substantially channel shaped and surrounds the horizontal bar of the T, the sides of the channel extending downwardly and outwardly therefrom, and that the shear plate has a center stiffening rib running the length of the upper face thereof and that the teeth in the upper surface of the cutter bar may not extend completely across the same, but that a rib may be left running in the center of the cutter bar similar to the stiffening rib of the shear plate above referred to. This construction provides a stiff shear plate which is not dependent in any manner on the cutter bar for support. The upper portions of the recesses 48 in the cutter head are enlarged so that the pins fit loosely therein so that they may travel with the oscillations of the cutter bar. In other words, the pins and springs are given a wobble fit in the recesses while at all times regardless of the position of the cutter bar they serve to press same in cooperative relationship with the shear plate to cut hair.

As the end supports 33 are flush with the ends of the cutter head 20, it is possible to place an end cap shown in dot and dash lines at 51 in Figure 1 over the head of the razor and said cap may be suitably slotted to fit around the cutaway portion 36 of the pin 35. This cap protects the razor from damage in case it is dropped, and prevents dust from getting into the mechanism of the cutter head.

The motor operating mechanism will now be described, and referring more particularly to Figure 7, it will be observed that a field structure generally denoted by the numeral 52 is mounted in any suitable manner in the casing 14. This field structure is preferably composed of a plurality of laminations which are held together by suitable rivets 53 and screws 53a may pass through the field structure and into the Bakelite casing 14, thereby holding the field structure in place therein.

The field structure has opposed arcuate pole shoes at the upper extremities thereof and on the lower portion of the field structure is supported one or more suitable windings or field coils 54, 55 in the usual manner.

A four pole rotor 56 is mounted on a shaft 57 which is journaled in suitable supporting plates 58, 59. The lower plate 58 may form part of the field structure and may be secured thereto by means of rivets 53. The upper plate 59 forms part of the interrupter assembly to be presently described and is therefore detachable from the field structure.

Figure 7:
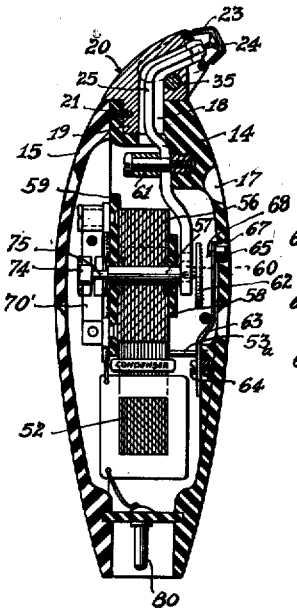
Figure 7 is a vertical sectional view of a complete device having the cutting head shown in Figure 1.
Figure 10:
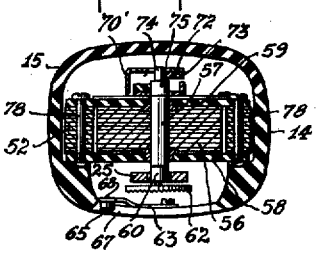
Figure 10 is a cross sectional view on the line 10—10 of Figure 9.
Figure 12:
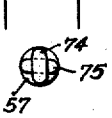
Figure 12 is an enlarged drawing of the cams used in the motor shown in the preceding figures.

These plates may be made of metal or of suitable insulating material, such as Bakelite, and if the latter is used, suitable bearings for shaft 57 may be inserted in the Bakelite as shown in Figures 7 and 10. The front end of the shaft 57 carries an eccentric or cam 60 which engages the lower forked end of the cutter arm or lever 25 and serves to oscillate the same, said cutter arm being supported on a bushing and screw 61, the screw passing into an insert in the Bakelite casing 14, the arm 25 being free to oscillate on said screw when the cam 60 revolves.

Figure 8:
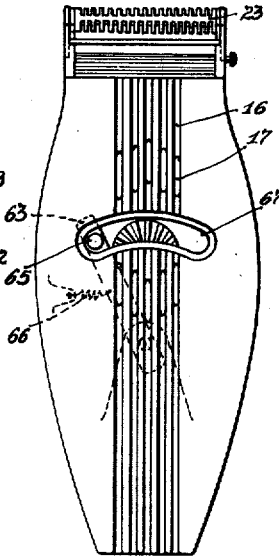
Figure 8 is a front view of the device shown in Figures 1 and 7.
Figure 9:
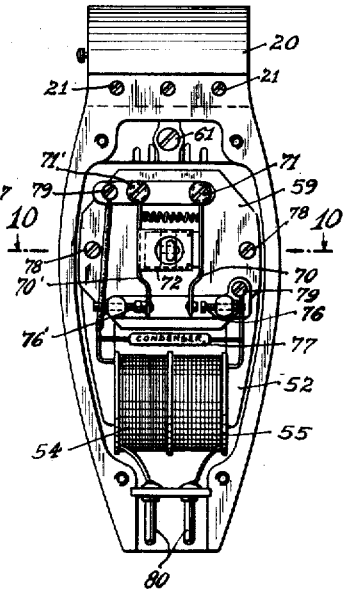
Figure 9 is a rear view of the device shown in Figure 7 with the cover removed to show the motor mechanism.
Figure 11:
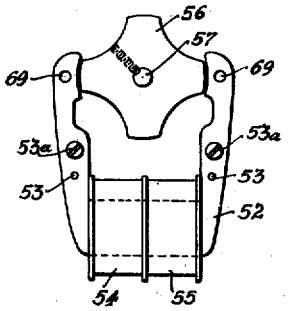
Figure 11 is a diagram showing the relative position of the motor coils, pole pieces and motor of the device shown in the preceding figures.

Positioned in front of the cam 60 is a toothed wheel 62 secured to the shaft 57. An arm 63 is mounted to turn on a screw 64 and is provided with a button 65 which is flush with the outer surface of the casing 14 or projects slightly therefrom so that it can be moved by the finger. A spring shown in dotted lines at 66 is connected to the arm 63 and to the casing 14 so that the arm is normally held by said spring in the position shown in Figure 8.

As motors of the type shown and described will not start when the current is applied to them, if the interrupter necessary for D. C. operation is open, to start said motor the button 65 is engaged by the finger and is moved rapidly in the slot 67 while at the same time the button is pressed inwardly. This flexes the arm 63 and brings the point 68 into engagement with the teeth on the wheel 62 and causes the same to rotate and this wheel being secured on shaft 57 causes the rotor 56 secured thereto to revolve to close one of the interrupter contacts to be described presently, thereby starting the motor.

The upper plate 59 constitutes a mounting plate for the interrupter mechanism. This mechanism comprises two breaker arms 70, 70' which are preferably made of stampings and which are supported on screws 71, 71'. These arms have turned-over portions which are both alike and one of which is shown at 72, to which are secured small pieces of fiber, one of which is shown at 73. These fiber pieces are adapted to engage the cams 74, 75 mounted on shaft 57, which cams are so placed in relation to the poles of the field structure and the cooperating poles of the rotor 56, that the current through coils 54, 55 is interrupted at the proper time to cause the rotor to revolve. The motor may thus be used either on direct or alternating current.

Figure 13:
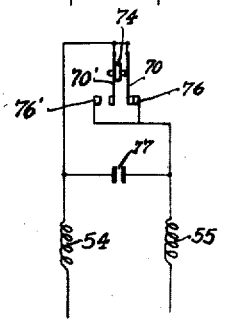
Figure 13 is a circuit diagram of the electrical connections of the device shown in the preceding figures.

The breaker arms 70, 70' are equipped at their ends with contact points which contact with the two stationary contacts 76, 76' respectively. The circuit of the interrupter mechanism and the coils are shown in Figure 13, which also shows a condenser 77 carried upon the field structure and connected across the interrupter and coil circuits, as shown, in order to prevent sparking.

The mounting plate 59 and parts mounted thereon constitute a unit assembly which may be held in place on the field structure by means of screws 78 which pass through holes 69 of the field structure, these screws being threaded into the bottom plate 58. The circuit from this unit interrupter to the coils may terminate on the screws 79 so that by loosening these screws and taking out the screws 78 the entire interrupter mechanism may be removed for examination and adjustment of the contact points if that be necessary, without disassembling the breaker arms and the cooperating adjustable stationary contacts 76, 76'. Also by having the holes in the plate 59 slightly larger than necessary to accommodate the screws 78, the plate 59 may be slightly shifted thereby permitting a relative adjustment to be accomplished between the cams 74, 75 and the breaker arms 70, 70'.

A pair of pin terminals 80 is provided located in a recess in the bottom of the casing 14 so that they do not project therefrom and these pin terminals connect to the motor circuit. The instrument may be provided with a suitable socket plug (not shown) to connect the pin terminals 80 to a source of current for operating the motor.

If desired, the bottom of the slot 18 just above the motor may be filled with sponge rubber or a transverse plate may be secured to the arm 25 to move therewith in order to close the slot 18 to prevent ingress of dust and moisture to the interior of the casing and the motor. Also the slot 67 can be normally closed by a slide connected to the lever arm 63 so that this slot is normally closed to prevent ingress of dust and moisture.

It will be seen from the general shape of the casing that because of the longitudinal slots 16 it is impossible for the hand of the user to so cover the device that the circulation of air therethrough is prevented, as air can always find its way into the slots and then into the casing through the vents 17, the upper openings of which lie below the flat outer surface of the device. Therefore, regardless of the position of the hand on the casing, the circulation of air will not be prevented.

It will also be observed that by reason of the quick detachability of the shear plate assembly shown in Figure 6 that this assembly can be instantly removed from the device for cleaning and that when so removed it is possible to merely lift the cutter bar 24 out of its supports 47 and that because of the difference in shape of the ends 41, 42 of said cutter bar, it is impossible to replace the same in the device in a reverse position which feature prevents wear on the cutter bar.

In operation the device may be held at an easy and normal angle to the face because of the curved shape of the cutter head 20 which brings the face of the shear plate 23 in contact with the face while the casing 14 is held at an easy and natural angle in the hand. This eliminates the necessity of holding the complete device at an angle perpendicular to the face, and facilitates the operation of shaving.

It will also be observed that as the slots of the shear plate extend through the corners of the channel-shaped member forming the same, said slots extending part way across the upper shaving face of the plate and partly down the sides thereof, that hairs may enter said slots without substantial bending of the hair at the surface of the skin as the device is passed over the skin in a direction substantially parallel to the slots; this is not the case with shear plates, the sides of which are not slotted and which have a sharp unslotted corner and where the slots extend fully across the face of the plate.

The improvement herein disclosed also contemplates leaving the stiffening rib indicated at 23*a* which extends the full length of the face of the shear plate so that this face is inflexible and not dependent on the cutter bar 24 below it for support. The shear plate is further stiffened as has been previously described and therefore may be washed or scrubbed with a brush for cleaning purposes without danger of bending the plate, which greatly facilitates the use of the device.

While the invention has been described in preferred embodiment, it is not limited to the precise structures illustrated, as various modifications may be made without departing from the scope of the appended claims.

What is claimed is:

1. In a device of the character described, in combination, a casing forming a body, a cutting head secured thereto and having recesses in the sides thereof, a shear plate assembly having portions adapted to enter said recesses, and means including a longitudinally movable pin mounted in said head and adapted to engage both of said portions to removably position the same on the head.

2. The combination as claimed in claim 1 wherein the shear plate assembly comprises a plate having a flat rectangular upper surface, the long sides of which extend downwardly and flare outwardly, the ends of said shear plate having downwardly extending supports secured thereto and said supports having pin engaging notches therein adapted to engage said pin.

3. The combination as claimed in claim 1 wherein a spring is mounted within said cutting head to urge said pin in a position to normally hold said shear plate assembly in position.

4. In a device of the character described, a casing having a cutting head secured thereto, a rectangular shear plate having a flat surface to be applied to the face and the sides of said plate being bent downwardly and outwardly from the flat surface thereof, transverse slots in said plate extending partway across the flat surface and the sides thereof, the lower portions of said sides and the end portions of said plate being rolled on themselves, a pair of end supports, means passing through the rolled portions of said plate for securing the same to said supports, and a cutter bar enclosed by said plate and adapted to cooperate therewith to cut hair.

5. A shaving device comprising a body, a reciprocating cutter, a shear plate encasing said cutter and being of substantially channel-shaped formation and forming a guard over the upper face of the cutter, said shear plate including a face engaging said cutter and sides extending therefrom inwardly toward said body, supports secured to the extremities of said inwardly extending sides of said shear plate for securing the same to said body while leaving the ends of the shear plate open, whereby hair cut by said cutter may find exit from said shear plate above said supports, the extremities of said inwardly extending sides of the shear plate being rolled on themselves and secured to the supports by means of pins passing through said rolled portions and into said supports.

6. In a device of the character described, a body forming a casing, a cutting head secured thereto, a shear plate having inward-extending ears carried by said head, a cutter bar positioned below said shear plate and adapted to cooperate therewith to cut hair, means engaging said bar and extending into said casing and adapted to oscillate said bar, spring pressed means carried by said head and adapted to urge said bar against the under side of said plate, said means including a spring-pressed pin mounted in said head, and means for securing said shear plate to said head including a pin mounted to slide longitudinally in said head and adapted to engage the ears extending from said plate.

7. A device of the character described comprising a body forming a casing, a rectangular shear plate having a flat surface adapted to engage the face and having sides extending downwardly therefrom, said face and sides having slots extending part way thereacross, a cutter bar enclosed by said shear plate, said cutter bar having a shank and teeth extending laterally from said shank, the teeth on one side of said shear being longer than on the other, a motor within said body, and means connecting said motor and bar whereby the latter may be reciprocated by the former.

8. In a device of the character described, a casing, a head member supported thereby, a shear plate supported on said head, a motor in said casing, a cutter bar adapted to be oscillated by said motor, said bar having a shank, the ends of said shank being supported in slots in said head member to permit said bar to be oscillated below said shear plate and said ends being of different sizes to prevent reversal of the ends when replacing said bar in working position, and cooperating means on said bar and plate to cut hair therebetween.

9. In a device of the character described, a casing having a slot on the outer surface thereof, a vent aperture extending between the bottom of said slot and the interior of said casing to permit the ingress of air to the interior thereof, a motor in said casing, a fixed shear plate mounted on said casing, a cutting member positioned to oscillate below said plate and to cooperate therewith to cut hair, and means extending between said member and motor whereby said member may be oscillated by said motor while the latter is cooled by air entering said casing via said slot and duct therein.

10. In a device of the character described, a casing, a shear plate supported thereon, a motor in said casing, a cutter bar connected to said motor to be oscillated thereby and adapted to cooperate with said plate to cut hair, and an interrupter on said motor adapted to be operated by the movement of the rotor thereof, said interrupter comprising a pair of movable contact arms, a pair of stationary contacts adapted to cooperate therewith, said arms and contacts having a unitary mounting plate detachably secured to said motor and removable therefrom, while said arms and contacts remain in place thereon and while all other parts of said motor remain in place in said casing.

11. In a device of the class described, a casing, a cutter head mounted thereon, means projecting from the casing to secure said head in place thereon, a shear plate mounted on said head, manually operable means in said head projecting therefrom to secure the plate to the head and to permit removal of said plate therefrom while said head remains in place on said casing, a motor in said casing, a cutter bar cooperating with said plate to cut hair, and means including a lever arm pivoted in said casing and having one end in oscillating driving engagement with said motor and the other end in oscillating engagement with said bar whereby the latter is oscillated by said motor, said casing being provided with a cover plate having its upper edge flush with the rear edge of said head, said cover and casing having holes therein whereby air may circulate about said motor while the same is in operation and slots in communication with said holes and extending longitudinally of said casing and cover to permit air to enter said holes irrespective of the manner in which said device is held in the hand.

12. In a device of the class described, a body forming a casing adapted to fit within the palm of the hand and to be held therein by the fingers, said casing having front and rear faces and sides forming continuous curves substantially symmetrical about its longitudinal axis, an independent removable cutter head at one end forming an extension thereof with its longitudinal axis at an angle to the axis of the casing and having a curved imperforate rear face forming a continuation of the curve on the rear face of said casing, a cutter bar and a channel-shaped shear plate at the outer end of the cutter head, said shear plate comprising relatively stiff material supported throughout its length independently of the cutter bar and including a flat face having a longitudinal imperforate stiffening rib of uniform width and of substantially the same thickness as said plate and a plurality of slots forming teeth extending laterally perpendicular to the axis of said rib across the face and around opposite corners of the channel-shaped plate, said cutter bar being adapted to reciprocate in a plane parallel to the inside surface of the rib and parallel to the inside surfaces of the teeth portions on said flat face in shearing relation thereto, said face being disposed at an obtuse angle relative to the axis of the casing and adapted during the act of shaving to assume a natural position flat against and substantially parallel to the skin when the casing is separated therefrom by a distance substantially equivalent to the thickness of the operator's fingers when held in the palm in the normal way.

13. In a shaving device of the character described, an elongated body forming a casing for shearing element operating mechanism, said casing being adapted to fit within the palm of the hand of a user of the shaver and to be held therein by the fingers of said hand when wrapped substantially therearound, said casing gradually tapering toward one end thereof in a substantially symmetrical manner about the longitudinal axis of the casing and terminating in a head portion having an axis curved upwardly and forwardly from the axis of the casing and terminating at an obtuse angle thereto, said head portion likewise tapering toward its terminal end in a substantially symmetrical manner about its curved axis and the back surface thereof forming a substantially smooth flowing continuation of the back surface of said casing, and hair shearing elements supported by said head and having a shearing face at substantially right angles to the axis of said terminal end of said head, to assume, during the act of shaving, a natural position substantially flat against the skin of the user when the tapered portion of said casing is separated therefrom by a distance substantially equivalent to the thickness of the user's fingers when held in the palm in the normal way with the adjacent surface of the tapered portion of said casing substantially parallel to the skin.

14. A shaving device comprising an elongated body forming a casing for shearing element operating mechanism, said casing being adapted to fit within the palm of the hand of a user of the shaver and to be held therein by the fingers of said hand, said casing terminating in a head portion having an axis curved upwardly and forwardly from the longitudinal axis of the casing and terminating at an obtuse angle to said longitudinal axis, said head portion having a back surface forming a substantially smooth flowing continuation of the back surface of said casing, and hair shearing elements supported by said head and having a shearing face at substantially right angles to the axis of said terminal end of said head, to assume, during the act of shaving, a natural position substantially flat against the skin of the user when said casing is separated therefrom by a distance substantially equivalent to the thickness of the user's fingers when held in the palm in the normal way with the adjacent surface of said casing substantially parallel to the skin.

RAYMOND KNAPP.